US012555915B2

(12) United States Patent
Singh et al.

(10) Patent No.: US 12,555,915 B2
(45) Date of Patent: Feb. 17, 2026

(54) SYSTEMS AND METHODS FOR ROTATING POLARIZATION OF RADIO FREQUENCY WAVES

(71) Applicant: Keysight Technologies, Inc., Santa Rosa, CA (US)

(72) Inventors: Kuljeet Singh, Fazilka (IN); Nishant Gandhi, Salem (IN)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 26 days.

(21) Appl. No.: 18/783,302

(22) Filed: Jul. 24, 2024

(65) Prior Publication Data

US 2026/0031543 A1 Jan. 29, 2026

(51) Int. Cl.
*H01Q 13/06* (2006.01)
*H01Q 15/24* (2006.01)

(52) U.S. Cl.
CPC ......... *H01Q 13/065* (2013.01); *H01Q 15/246* (2013.01)

(58) Field of Classification Search
CPC ........................... H01Q 13/065; H01Q 15/246
See application file for complete search history.

(56) References Cited

U.S. PATENT DOCUMENTS

| | | |
|---|---|---|
| 6,404,298 B1 | 6/2002 | Rohr et al. |
| 6,995,628 B2 | 2/2006 | Asao et al. |
| 7,212,087 B2 | 5/2007 | Nagai |
| 9,203,128 B2 | 12/2015 | Hoover et al. |
| 11,289,787 B2 | 3/2022 | Yang |
| 2019/0198963 A1 | 6/2019 | Zhuo et al. |

FOREIGN PATENT DOCUMENTS

| | | |
|---|---|---|
| CN | 108011166 A | 5/2018 |
| CN | 108039541 B | 5/2018 |
| JP | 1986133701 A | 6/1988 |
| JP | 1993006901 U | 1/1993 |
| WO | 2011052694 A1 | 5/2011 |
| WO | 2023247647 A1 | 12/2023 |

OTHER PUBLICATIONS

Chen, L., Arsenovic, A., Stanec, J.R., Reck, T.J., Lichtenberger, A.W., Weikle, R.M. and Barker, N.S. A Micromachined Terahertz Waveguide 90° Twist. IEEE microwave and wireless components letters, 21(5), pp. 234-236 (2011).
Pasternack Inc. —Precision Waveguide Twists (Apr. 25, 2024).
(Continued)

*Primary Examiner* — Graham P Smith

(57) ABSTRACT

A system for rotating polarization of radio frequency (RF) waves includes a flange configured to couple to a waveguide interface at a first side of the flange. The flange includes a recess at the first side of the flange, a rectangular cavity through the flange and located in the recess, and pins extending from the recess. The system further includes a plurality of shims configured for stacking in the recess. The shims each include a rectangular cavity and holes configured to receive the pins and position the plurality of shims in the recess such that the rectangular cavities form a spiral configured to rotate polarization of linearly-polarized RF waves received at the flange from a first polarization to a second polarization angularly rotated from the first polarization.

20 Claims, 15 Drawing Sheets

(56) References Cited

OTHER PUBLICATIONS

Vivatech SAS—Precision Waveguide converters, p. 20.
Yang, "E-band One-step 45° Double-winf Gap Waveguide Twist for Waveguide WR12", 2017 International Symposium on Antennas and Propagation (ISAP 2017), pp. 1-3 (2017). https://dx.doi.org/10.1109/ISANP.2017.8228777.
Ediss, et al, "WR-10 Waveguide Vacuum Feedthrough for the ALMA Band-6 Cartridge." ALMA Memo 536, pp. 1-10 (Sep. 2005).
"IEEE Standard for Rectangular Metallic Waveguides and Their Interfaces for Frequencies of 110 GHz and Above—Part 2: Waveguide Interfaces", IEEE Standards Association, IEEE Std 1785.2, pp. 1-22 (2016).

SYSTEMS AND METHODS FOR ROTATING POLARIZATION OF RADIO FREQUENCY WAVES

TECHNICAL FIELD

The subject matter described herein relates to linearly-polarized radio frequency waves. More specifically, the subject matter relates to systems and methods for rotating polarization of radio frequency (RF) waves.

BACKGROUND

Waveguides are devices which transmit linearly-polarized radio waves by confining and directing the propagation of the waves. Waveguides typically have a rectangular cavity which controls the transmission of RF energy and operates in a narrow radio frequency band. A waveguide flange connects one waveguide section to another, and this interface is standardized by IEEE 1785.2. This ensures that the user interface for the frequency band is compatible with other devices or devices under test (DUTs).

Waveguides generally include either a vertically-polarized antenna that usually emit RF waves with an E-plane (the plane containing the electric field vector) coinciding with the vertical/elevation plane or a horizontally-polarized antenna that usually emit RF waves with an E-plane coinciding with the horizontal/azimuth plane. The former RF wave orientation is also referred to herein as H-field orientation, in which the magnetic field of the wave is vertically oriented, and the latter RF wave orientation is also referred to herein as E-field orientation, in which the electric field of the wave is vertically oriented. The vast majority of the waveguides and flanges include a vertically polarized antenna and emit RF waves with a vertical E-plane. However, for some uses, the waveguide flange needs to emit radio waves with the H-plane coinciding with the horizontal/azimuth plane, which would make it incompatible with the mating device having the other orientation and vice versa. To make the interfaces compatible, an external adaptor, such as a waveguide twist, is attached to the waveguide flange to change the polarization for use with the compatible DUT/mating interface.

Current adapters are typically an inch long and are primarily of two types. The first type is a long and smooth twist that rotates the E-field wave into H-field wave and vice versa. The concept behind this technique is the physical rotation of the electromagnetic wave. The second type of adaptors use one or more shims to convert E-field wave into H-field wave and vice versa. These type of adaptors operate on the principle of electromagnetic wave coupling. These adapters use one or more shims, which are pieces of metal are uniquely and precisely cut/machined to form a double ridge, overlapping squares, dog-bone, or special cavities to change the waveguide polarization. These shims pose high manufacturing challenges especially at sub-THz frequencies and are expensive. These shims have bulky structure to support them. There is a need for a compact and less expensive adaptor.

SUMMARY

The subject matter relates to methods, systems, and computer readable media for rotating polarization of RF waves. An example system for rotating polarization of radio frequency (RF) waves, includes a flange configured to couple to a waveguide interface at a first side of the flange.

The flange includes a recess at the first side of the flange, a rectangular cavity through the flange and located in the recess, and pins extending from the recess. The system further includes a plurality of shims configured for stacking in the recess, wherein the shims each include a rectangular cavity and holes configured to receive the pins and position the plurality of shims in the recess such that the rectangular cavities form a spiral configured to rotate polarization of linearly-polarized RF waves received at the flange from a first polarization to a second polarization angularly rotated from the first polarization.

According to another aspect of the system described herein, the second polarization is rotated by an angle of 90° from the first polarization.

According to another aspect of the system described herein, removing at least one shim of the plurality of shims reduces the degree of angular rotation from the first polarization to the second polarization.

According to another aspect of the system described herein, the shims each comprise a disc and the holes are formed along a circumference of the disc.

According to another aspect of the system described herein, the holes comprise indexing holes to fix the rectangular cavity of each of the shims at a predetermined angular orientation for incrementally changing the polarization of an RF wave traveling through the flange.

According to another aspect of the system described herein, the shims are identical to each other and each shim comprises more holes than the flange comprises pins.

According to another aspect of the system described herein, the shims each comprise a square profile.

According to another aspect of the subject matter described herein, the system further includes a backing plate configured to secure the plurality of shims in the recess, wherein a wall of the backing plate comprises indents to receive corners of the shims.

According to another aspect of the system described herein, the shims are reversible to rotate the polarization of RF waves±an angle from the first polarization.

According to another aspect of the system described herein, the system is configured for integration into an Institute of Electrical and Electronics Engineers (IEEE) 1785.2 and/or a UG-387 standard waveguide flange interface.

An example method for rotating polarization of radio frequency (RF) waves includes receiving, at an integrated waveguide twist assembly, linearly-polarized RF waves. The integrated waveguide twist assembly includes a flange coupled to a waveguide interface at a first side of the flange. The flange includes a recess at the first side of the flange, a rectangular cavity through the flange and located in the recess, and pins extending from the recess. The integrated waveguide twist assembly includes a plurality of shims configured for stacking in the recess, wherein the shims each includes a rectangular cavity and holes configured to receive the pins and position the plurality of shims in the recess such that the rectangular cavities form a spiral. The plurality of shims are further configured for rotating, by the formed spiral, polarization of the RF waves received at the integrated waveguide twist assembly from a first polarization to a second polarization angularly rotated from the first polarization.

According to another aspect of the method described herein, the second polarization is rotated by an angle of 90° from the first polarization.

According to another aspect of the method described herein, removing at least one shim of the plurality of shims reduces the degree of angular rotation from the first polarization to the second polarization.

According to another aspect of the method described herein, the shims each comprise a disc and the holes are formed along a circumference of the disc.

According to another aspect of the method described herein, the holes comprise indexing holes to fix the rectangular cavity of each of the shims at a predetermined angular orientation for incrementally changing the polarization of an RF wave output from the waveguide or a previous one of the shims.

According to another aspect of the method described herein, the shims are identical to each other and each shim comprises more holes than the flange comprises pins.

According to another aspect of the method described herein, the shims each comprise a square profile.

According to another aspect of the method described herein, the integrated waveguide twist assembly includes a backing plate configured to secure the plurality of shims in the recess, wherein a wall of the backing plate comprises indents to receive corners of the shims.

According to another aspect of the method described herein, the shims are reversible to rotate the polarization of RF waves±an angle from the first polarization.

According to another aspect of the method described herein, the system is configured for integration into an Institute of Electrical and Electronics Engineers (IEEE) 1785.2 and/or a UG-387 standard waveguide flange interface.

BRIEF DESCRIPTION OF THE DRAWINGS

The subject matter described herein will now be explained with reference to the accompanying drawings of which.

DETAILED DESCRIPTION

The subject matter described herein includes systems and methods for rotating polarization of RF waves. An integrated waveguide twist assembly can be connected to a waveguide interface and twist or rotate the polarization of RF waves either emitted by the connecting waveguide interface or emitted by another device to be received by the waveguide interface. The integrated waveguide twist assembly includes a flange incorporating a twist assembly using stacked shims. The shims can be identical disks each with a rectangular cavity equal in size or slightly larger than a waveguide cavity. Each shim has a series of holes along a periphery for indexing and locating the shim onto pins extending from a recess in the flange. The holes allow for each rectangular cavity in the shims to have a different angular orientation and collectively form a spiral for rotation the polarization of RF waves. The shims are also reversible to rotate the RF waves clockwise or counterclockwise.

Figure 1:
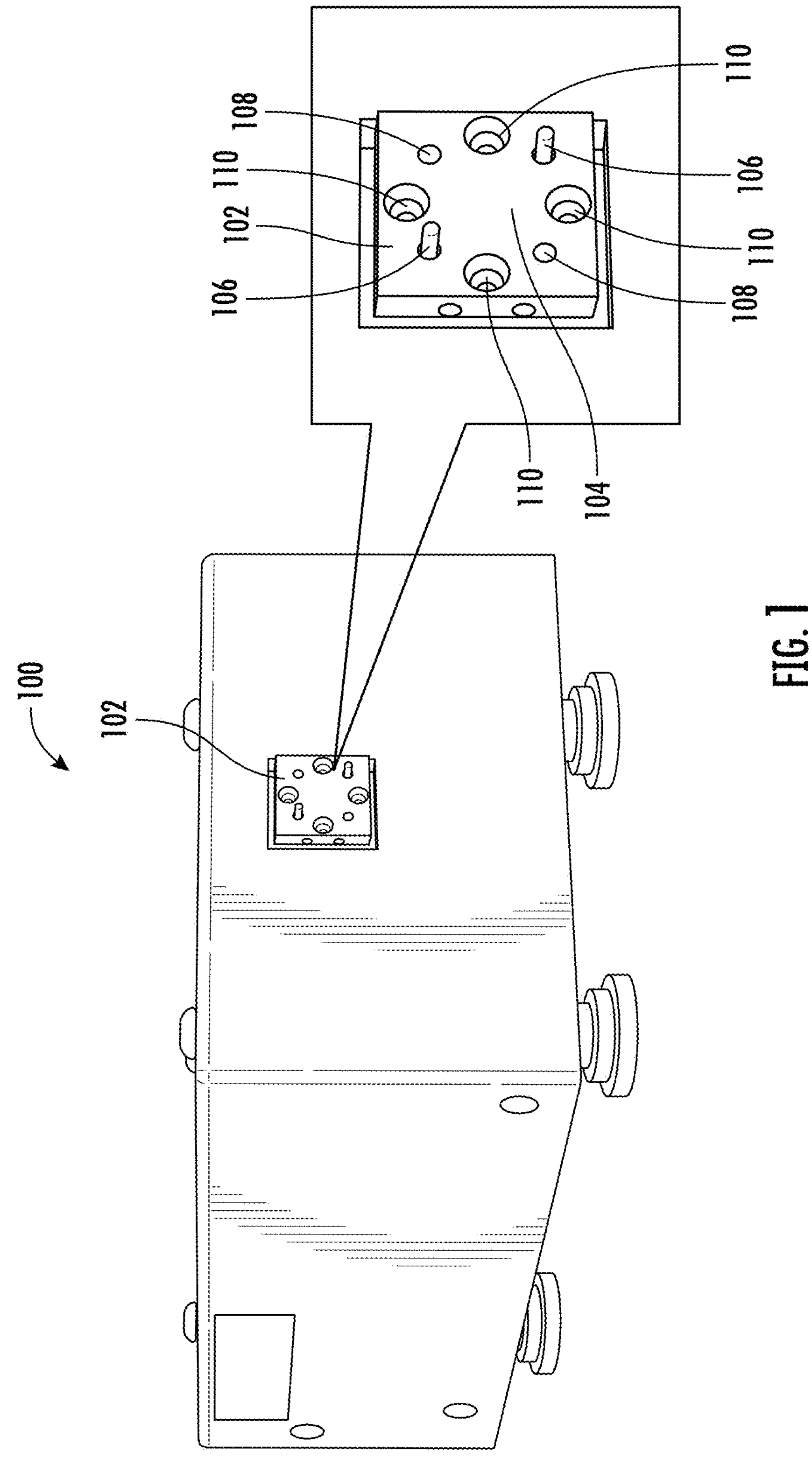
FIG. 1 (PRIOR ART)
FIG. 1 is a perspective view of a prior art module with a waveguide interface and a magnified view of the standard waveguide interface.

FIG. 1 is a perspective view of a prior art module 100 with a waveguide interface 102 and a magnified view of the waveguide interface 102. Module 100 transmits or receives linearly-polarized high frequency radio waves through a rectangular waveguide cavity 104 in the waveguide interface 102. Module 100 can include co-axial outputs that would connect to adaptors for co-axial to waveguide conversion.

Linearly-polarized RF waves that are transmitted from and/or received by module 100 pass through rectangular waveguide cavity 104 in waveguide interface 102. Waveguide interface 102 shown in FIG. 1 is the MIL-DTL-3922/67D (also known as UG 387) interface and includes fixed alignment pins 106, alignment holes 108, and screw holes 110 to align and couple with another interface or flange.

Figure 2:
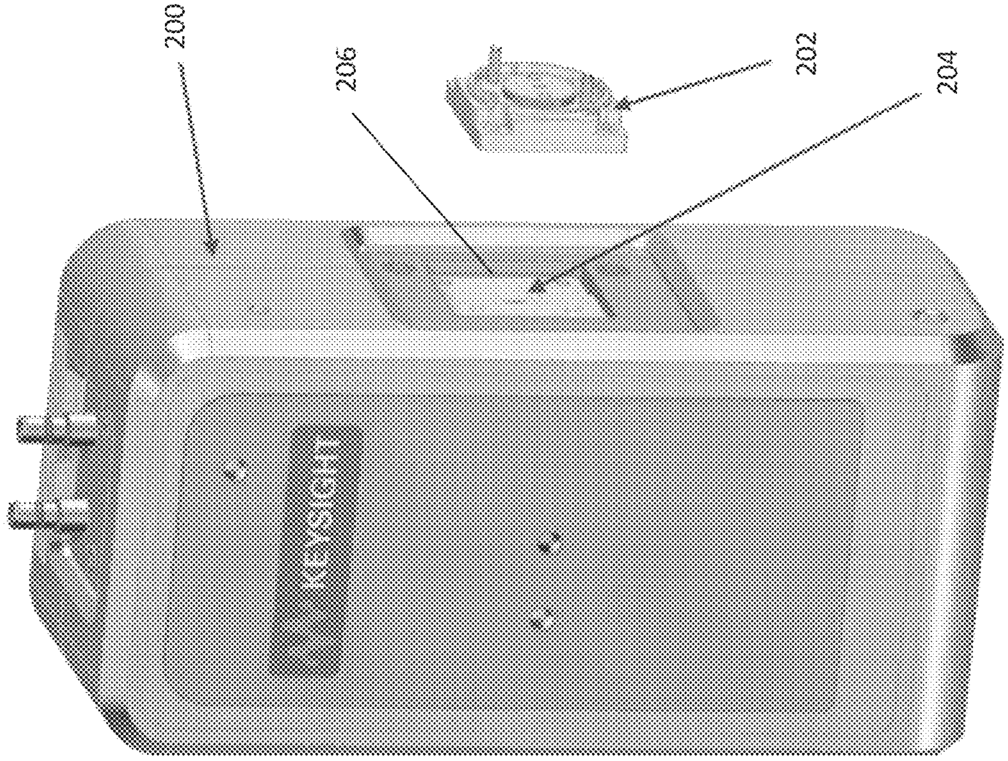
Prior Art FIG. 2
FIG. 2 is an exploded view of a prior art module with a waveguide interface and a prior art standard waveguide flange.

FIG. 2 is an exploded view of a prior art module 200 with a waveguide interface 206 and a prior art standard waveguide flange 202 for connecting to waveguide interface 206 of module 200. Similar to module 100, module 200 guides high frequency radio waves to propagate through a rectangular waveguide cavity 204 in waveguide interface 206.

Figure 3:
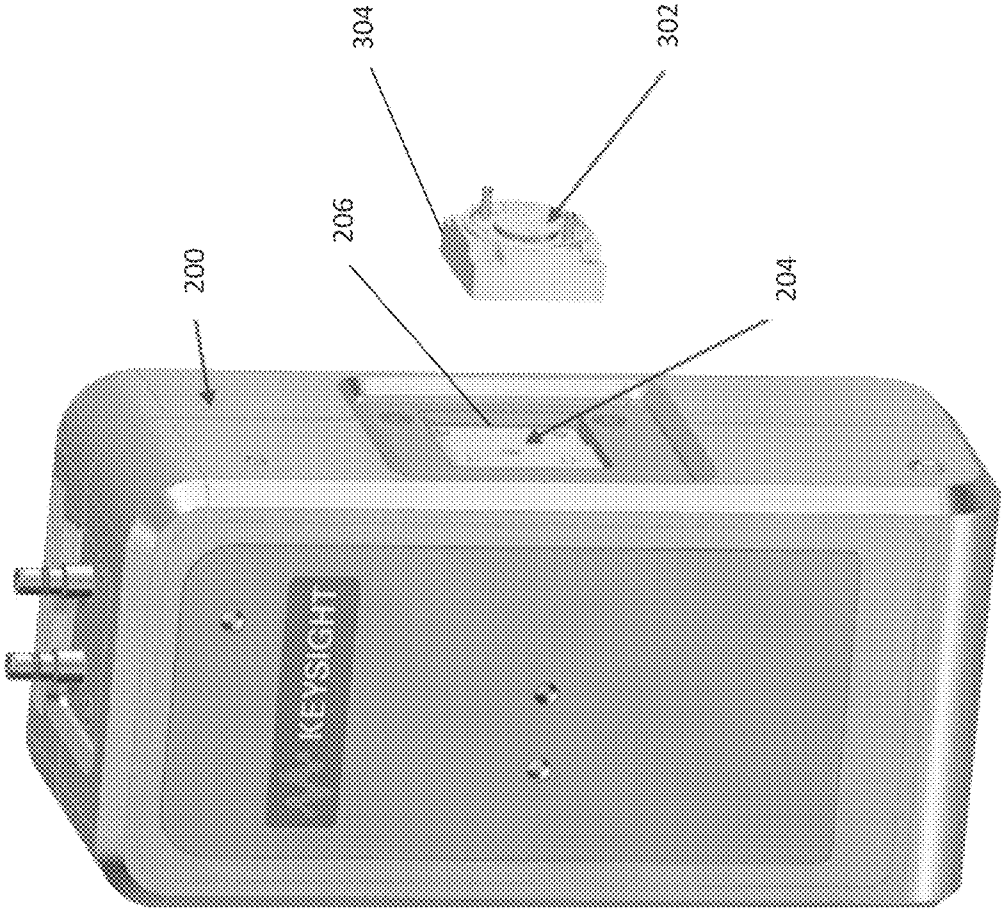
FIG. 3 is an exploded view of a module and an integrated waveguide twist assembly.

FIG. 3 is an exploded view of module 200 and an integrated waveguide twist assembly 302 capable of connecting to module 200 at waveguide interface 206 and aligning with rectangular waveguide cavity 204. Unlike standard waveguide flange 202, integrated waveguide twist assembly 302 twists or rotates the polarization of the waves emitted from module 200. Unlike other adaptors or twists, integrated waveguide twist assembly 302 integrates polarity conversion components into a flange 304, rather than as a bulky and expensive additional component to connect to and extend from a flange. Integrated waveguide twist assembly 302 provides a twist integrated into a flange, rather than as part of an antenna. Integrated waveguide twist assembly 302 includes a flange 304 configured to couple to a module, such as module 200, at a first side of the flange 304. In an aspect where module 200 is emitting RF waves, integrated waveguide twist assembly 302 receives RF waves emitting from module 200 and emits rotated RF waves from a second side of flange 304 opposite of the first side. In an aspect where module 200 is receiving RF waves, integrated waveguide twist assembly 302 first receives the RF waves from the second side of flange 304 and emits rotated RF waves from the first side of flange 304 to module 200. Flange 304 can be precision machined made from any metals and alloys of brass, steel, beryllium copper, molybdenum copper, etc. Although integrated waveguide twist assembly 302 is described as rotating RF waves, it is understood that the integrated waveguide twist assembly 302 has broadband DC to sub-terahertz (THz) applications.

Figure 4A:
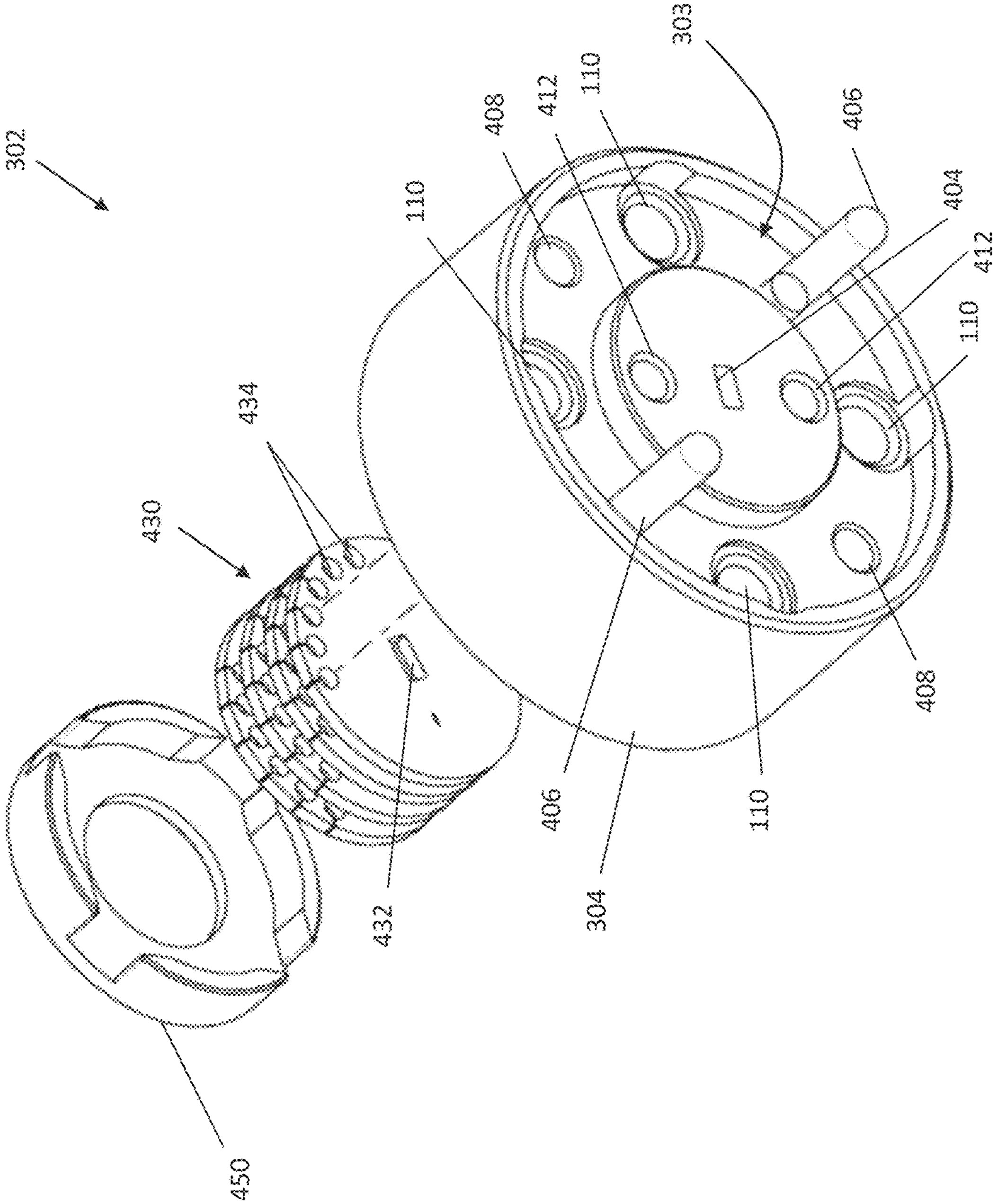
FIG. 4A is an exploded front view of an integrated waveguide twist assembly.
Figure 4B:
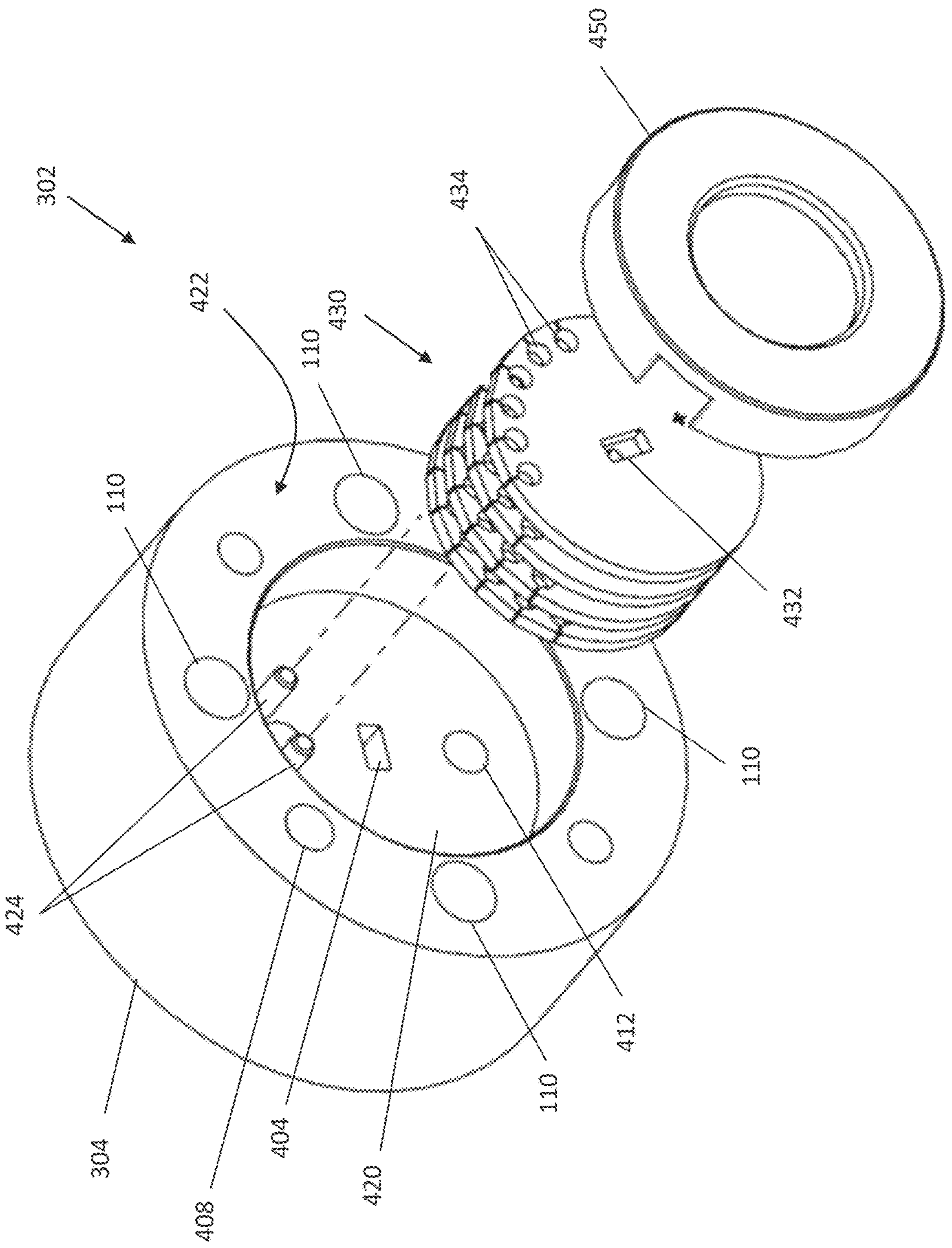
FIG. 4B is an exploded rear view of an integrated waveguide twist assembly.
Figure 5A:
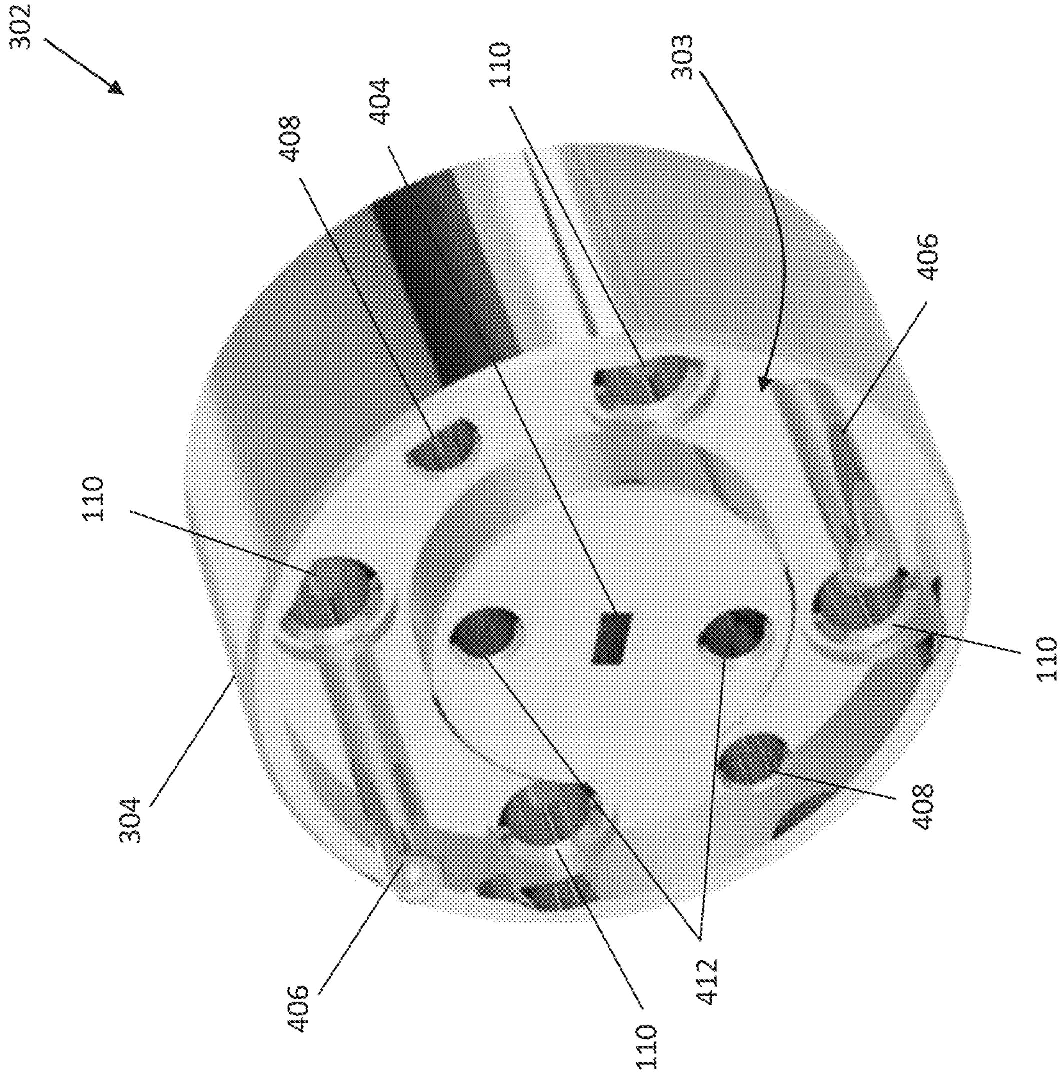
FIG. 5A is a front view of an integrated waveguide twist assembly.
Figure 5B:
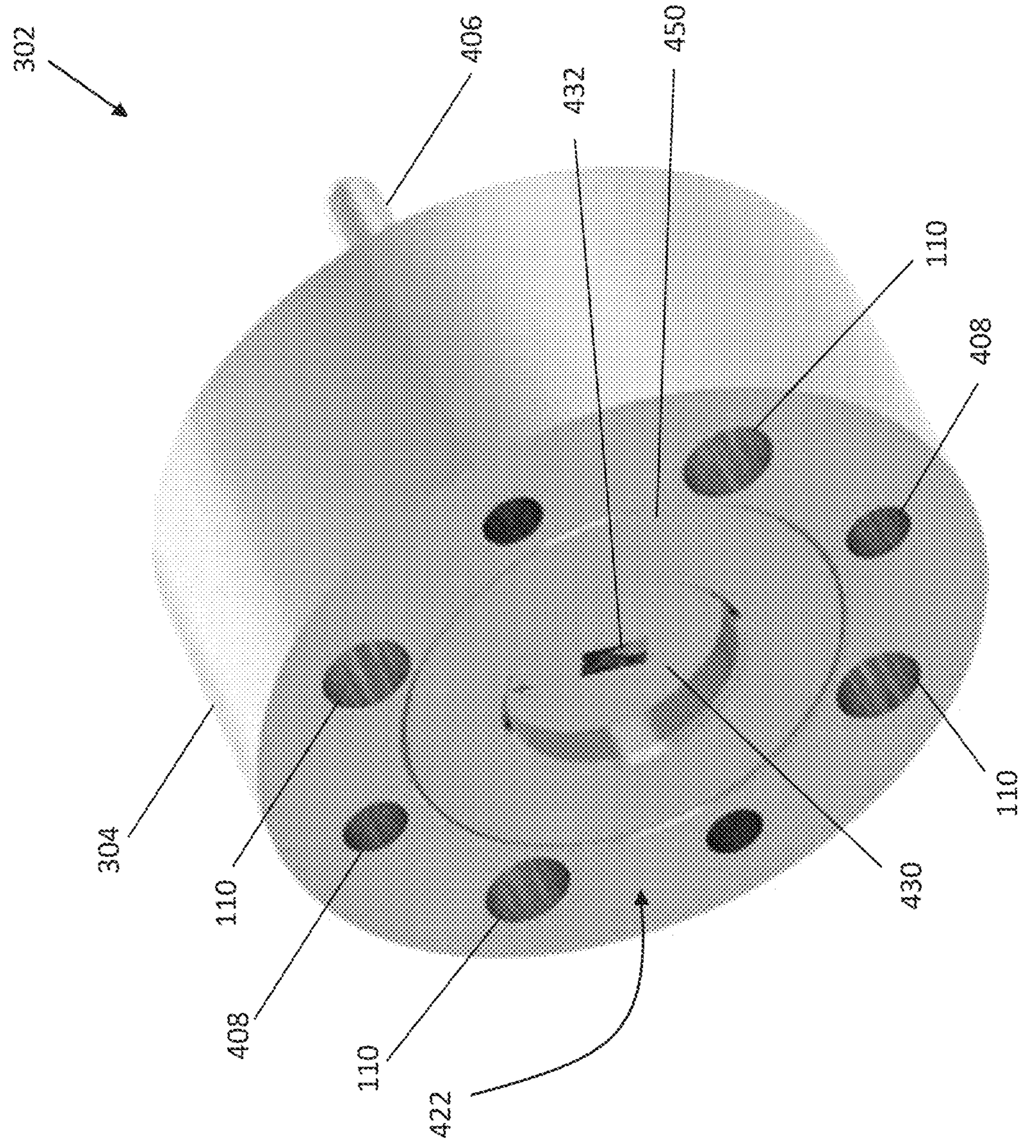
FIG. 5B is a rear view of an integrated waveguide twist assembly.
Figure 6B:
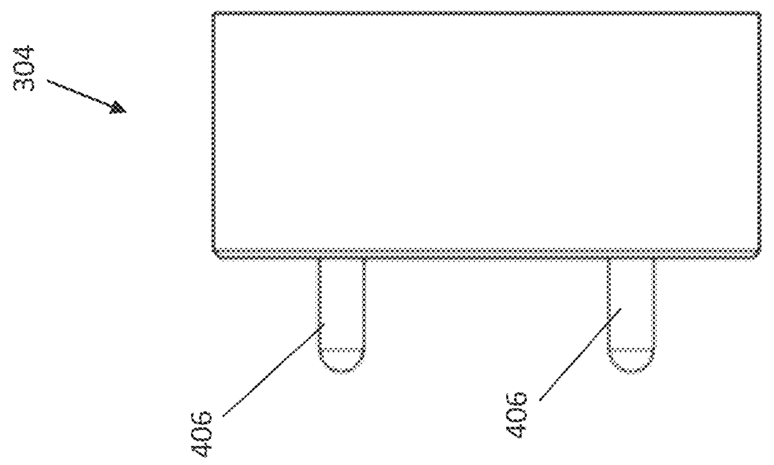
FIG. 6B is a side view of a flange.
Figure 6A:
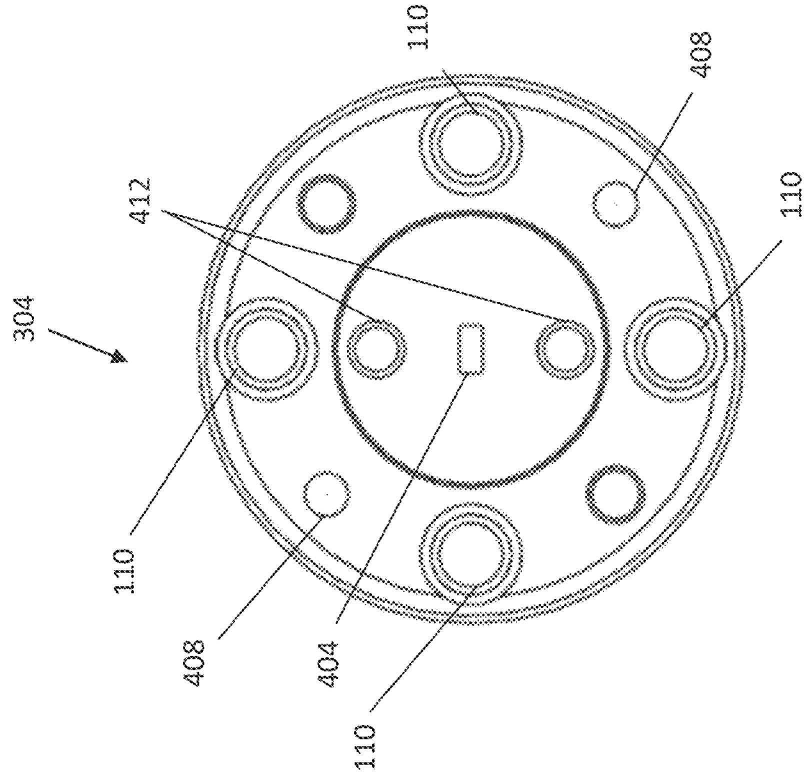
FIG. 6A is a front view of a flange.
Figure 6D:
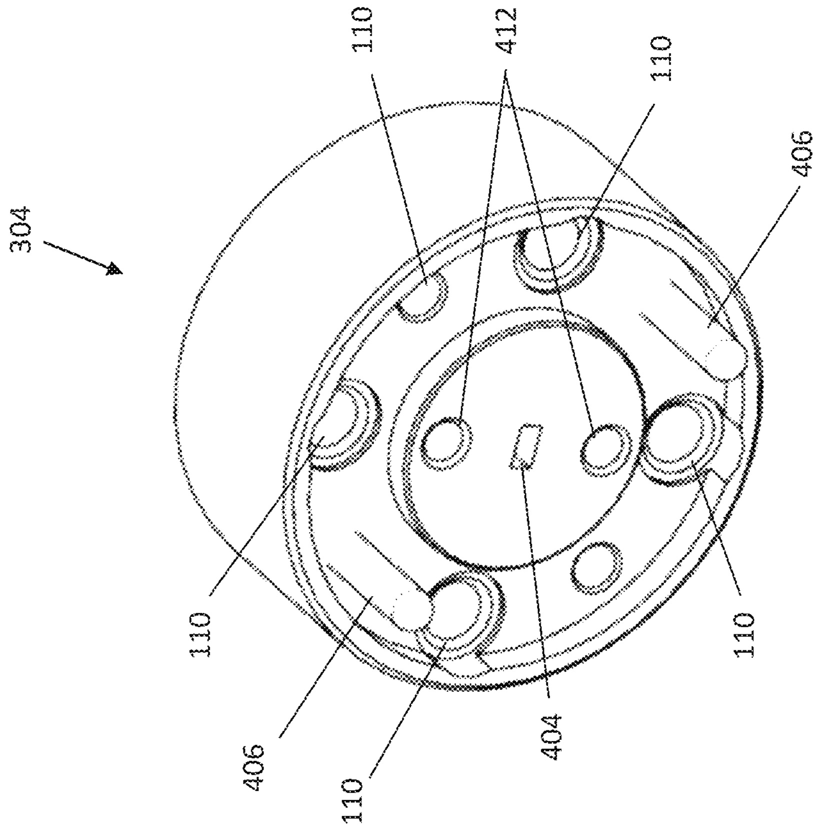
FIG. 6D is a peripheral front view of a flange.
Figure 6C:
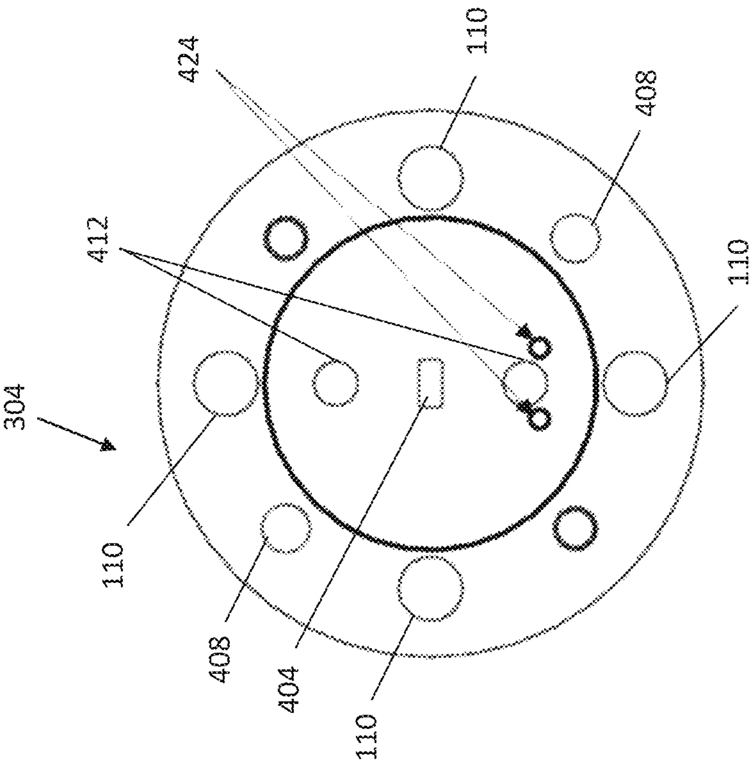
FIG. 6C is a rear view of a flange.

FIGS. 4A and 4B are respectively an exploded front view and an exploded rear view of integrated waveguide twist assembly 302. FIGS. 5A and 5B are a front view and a rear view of integrated waveguide twist assembly 302, respectively. Flange 304 includes a first side 422 and an opposite second side 303. Integrated twist assembly can be bidirectional, meaning it can receive RF waves from first side 422 or second side 303. Integrated waveguide twist assembly 302 can connect to another module at second side 303 and pass RF waves between module 200, as shown in FIG. 3, and the other module, twisting the RF waves as they are being passed. Second side 303 has a rectangular cavity 404 through which the rotated RF waves are emitted in circumstances in which module 200, as shown in FIG. 3, emits RF waves. In circumstances in which module 200 receives the RF waves, rectangular cavity 404 receives RF waves and can commence the rotation of the RF waves as discussed herein. Flange 304 can be configured for integration into an IEEE 1785.2 standard waveguide flange interface. Second side 303 of flange 304 can include a mating interface with fixed alignment pins 406, alignment holes 408, and/or screw holes 110 to align and couple with another interface or flange. For example, flange 304 can include the IEEE 1785-2a interface with holes 412 of equal diameter, one on either side of rectangular cavity 404, to receive a planar alignment dowel and an angular alignment dowel to connect with another interface. Flange 304 can include a IEEE 1785-2b centering ring interface configured to receive a centering ring for aligning bosses on two mated waveguides. Flange 304 can be compatible with UG 387 interface, which is a standardized anti-clocking interface with a 0.75 inch diameter, and its variants. Flange 304 can include the IEEE 1785-2c plug interface or jack interface configured to connect to a plug or jack interface.

Flange 304 includes a recess 420 at first side 422 of flange 304. Rectangular cavity 404 through flange 304 is located in recess 420 and extends through second side 303. Two pins 424 extend from recess 420. In some aspects of the described subject matter, pins 424 can include more than two pins. Integrated waveguide twist assembly 302 includes a plurality of shims 430 configured for stacking in recess 420. Shims 430 each include a rectangular cavity 432 that is the same size or slightly larger than rectangular waveguide cavity 204 in waveguide interface 206, as shown in FIG. 3. Each shim 430 includes holes 434 configured to receive pins 424 and position the shim 430 in recess 420 such that the stacked rectangular cavities 404 form a spiral configured to rotate polarization of RF waves received at first side 422 of flange 304 from a first polarization to a second polarization angularly rotated from the first polarization. Shims 430 can each be a precision cut piece. Shims 430 can each be identical to each other, which greatly simplifies manufacturing. Shims 430 can be a disk shape and holes 434 can be formed along a circumference of the disk. To further use an easy unconventional manufacturing process of forming each hole 434 in shims 430, an incision can be made at the circumference or edge of shims 430 to the location of the hole 434. Shims 430 may be machined by material removal process, such as milling, Wire-EDM, etc., or by an additive manufacturing process, such as 3D printing, Ultraviolet Lithographie Galvanoformung Abformung (UV-LIGA) which combines the microfabrication techniques lithography, electroforming, and molding while utilizing an ultraviolet source, etc. Shims 430 can be made from non-metals (with a conductive plating), metals and alloys not limited to copper, brass, steel, stainless steel, aluminum, and the like.

Holes 434 are indexing holes to fix rectangular cavity 432 of each shim 430 at a predetermined angular orientation for incrementally changing the polarization of an RF wave output from the waveguide (or waveguide module) or a previous one of the shims 430. Thus, the number of holes 434 in shims 430 is greater than the number of pins 424. A first shim 430 can be indexed at first and third holes 434, the next shim 430 can be indexed at second and fourth holes 434, and so on. In one aspect, holes 434 are evenly spaced along the circumference of shims 430. The angular displacement of holes 434 are positioned on shims 430 according to the angular displacement of pins 424. Adjacent holes 434 can be separated by a distance to match the space between pins 424 or can be spaced closer together so one or more holes 434 are between the holes 434 that fit on pins 424. Namely, the distance between the pins 424 can match the distance between adjacent holes 434, every other hole 434, every third hole 434, or so on. In another aspect, holes can be grouped according to the number of pins 424. For example, in an aspect where flange 304 has two pins 424, holes 434 can be grouped in sets of two, wherein the two holes 434 in a group are separated by a first distance to match the orientation of pins 424 and adjacent holes 434 in different groups are separated by a second distinct distance, which defines the minimum degree of rotation of rectangular cavity 432 between adjacent shims 430.

The second polarization can be rotated by an angle of 90° from the first polarization, which inverts the orientations of the E-field and the H-field of the RF waves. Shims 430 are reversible and can be flipped to rotate the second polarization by a negative angle, such as negative 90°. In one example aspect, integrated waveguide twist assembly 302 can include four shims 430. In this example with an overall rotation of 90° and four shims 430, where rectangular cavity 404 in flange 304 provides the final incremental rotation, there are a total of five incremental rotations. If each incremental rotation is equal, then rectangular cavities 432 are offset from the rectangular cavities 432 in adjacent shims 430 by 18° and rectangular cavity 404 in flange 304 is rotated by 18° in relation to the rectangular cavity 432 in the adjacent shim 430. Intermediate polarization angles are also possible by removing shims 430, without further setup change, such as +36° by removing three shims 430, 54° by removing two shims 430, and 72° by removing one shim 430. It is understood that the number of shims 430, the angle of rotation from the first polarization to the second polarization, and the incremental rotation between adjacent shims 430 can be adjusted. For example, integrated waveguide twist assembly 302 can include two, three, four, five, six, or more shims 430. The angle of rotation from the first polarization to the second polarization can be ±15°, 30°, 45°, 60°, 75°, 90°, 105°, or any other determined angle of rotation. The placement of holes 434 in shims 430 and/or the indexing selection can be adjusted to alter the incremental rotation between adjacent shims 430 to, for example, ±5°, 9°, 10°, 15°, 18°, 20°, or any other angle.

A backing plate 450 can fit securely in recess 420 over the stacked shims 430 at first side 422 of flange 304. Backing plate 450 can be a precision machined piece and serves to hold shims 430 on flange 304. As backing plate 450 secures shims 430 in place, the shims do not require fasteners to connect to flange 304. Backing plate 450 can be machined by material removal process like milling or by additive manufacturing process like UVLIGA, 3D printing, etc. Backing plate 450 can be made from non-metals, metals and alloys including copper, brass, steel, stainless steel, aluminum, etc.

FIGS. 6A-6D are a front view, side view, rear view, and peripheral front view of flange 304, respectively. FIGS. 6A-6D show flange 304 with screw holes 110, holes 412 to receive precision dowels, rectangular cavity 404, fixed alignment pins 406 extending from second side 303, and alignment holes 408.

Figure 7C:
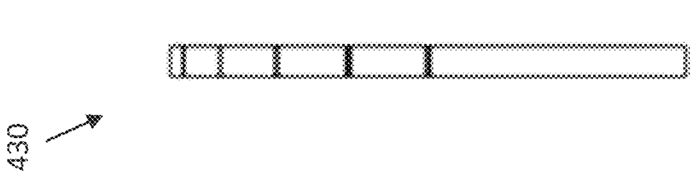
FIG. 7C is a side view of a shim.
Figure 7B:
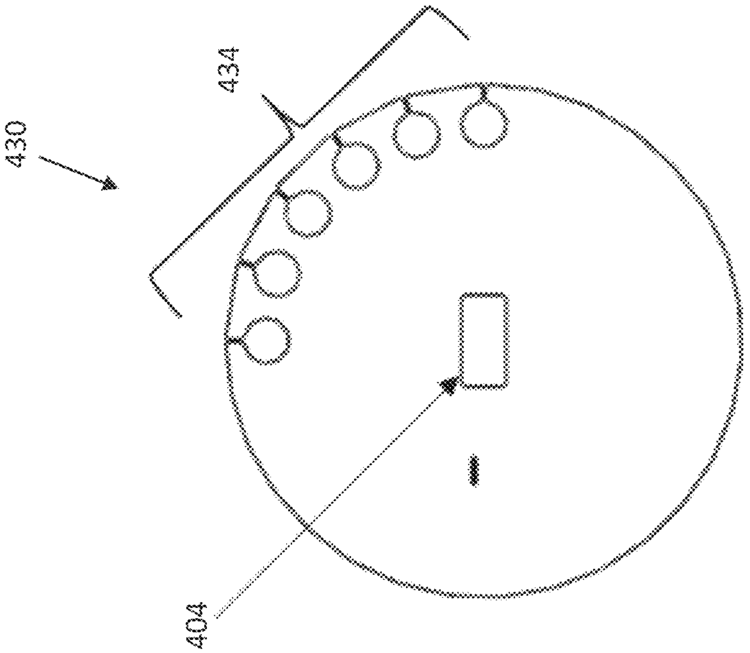
FIG. 7B is a front view of a shim.
Figure 7A:
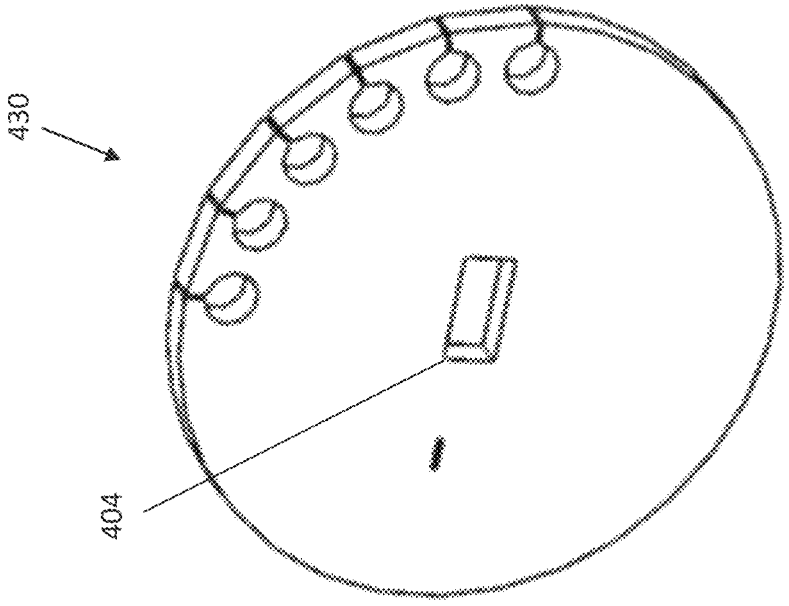
FIG. 7A is a peripheral front view of a shim.
Figure 8B:
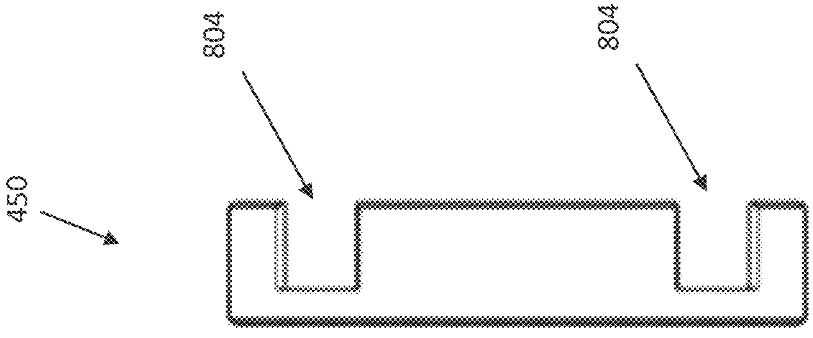
FIG. 8B is a side view of a backing plate.
Figure 8A:
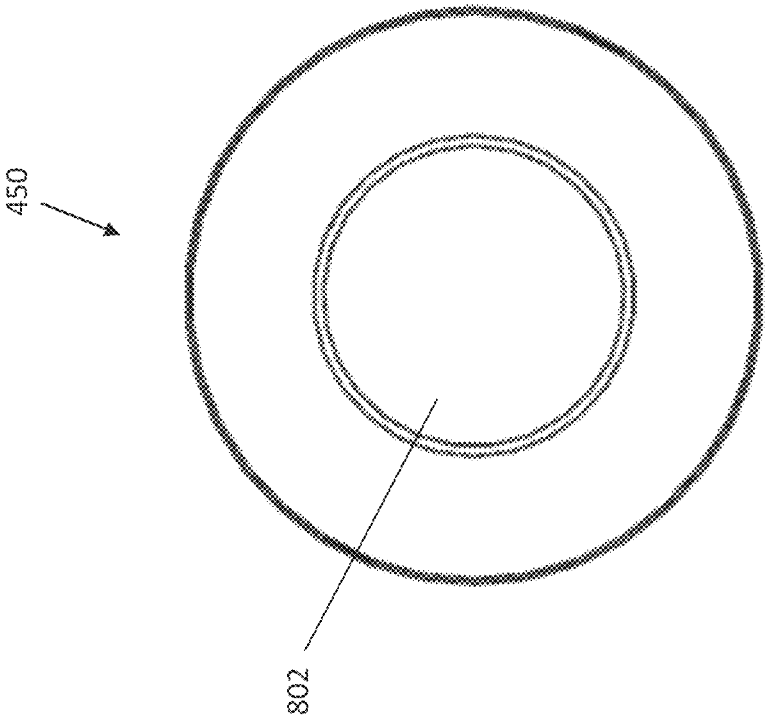
FIG. 8A is a rear view of a backing plate.
Figure 8D:
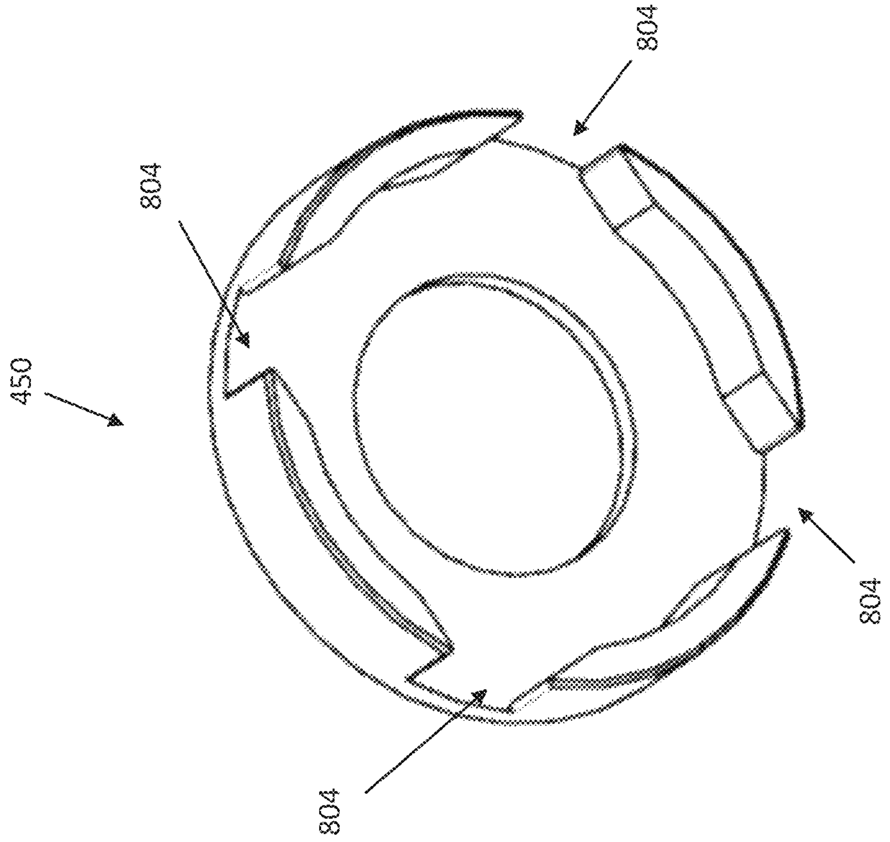
FIG. 8D is a peripheral front view of a backing plate.
Figure 8C:
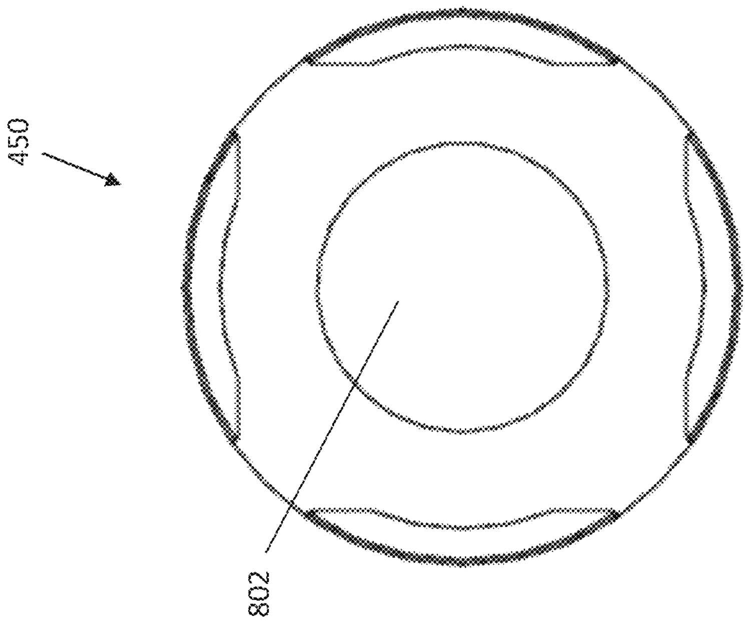
FIG. 8C is a front view of a backing plate.

FIGS. 7A-7C are respectively a peripheral front view, front view, and side view of shim 430. As described herein, shims 430 are reversible and can be flipped to provide a negative angle of rotation. Opposite sides of shims 430 can be marked with a positive sign "+" to identify a positive angle of rotation and a negative sign "−" to identify a negative angle or rotation. Shim 430 as shown in FIGS. 7A and 7B is marked with a negative sign "−" to indicate an orientation of the shim 430 that would provide a negative angle of rotation based on the angular orientation of rectangular cavity 432.

Figure 9A:
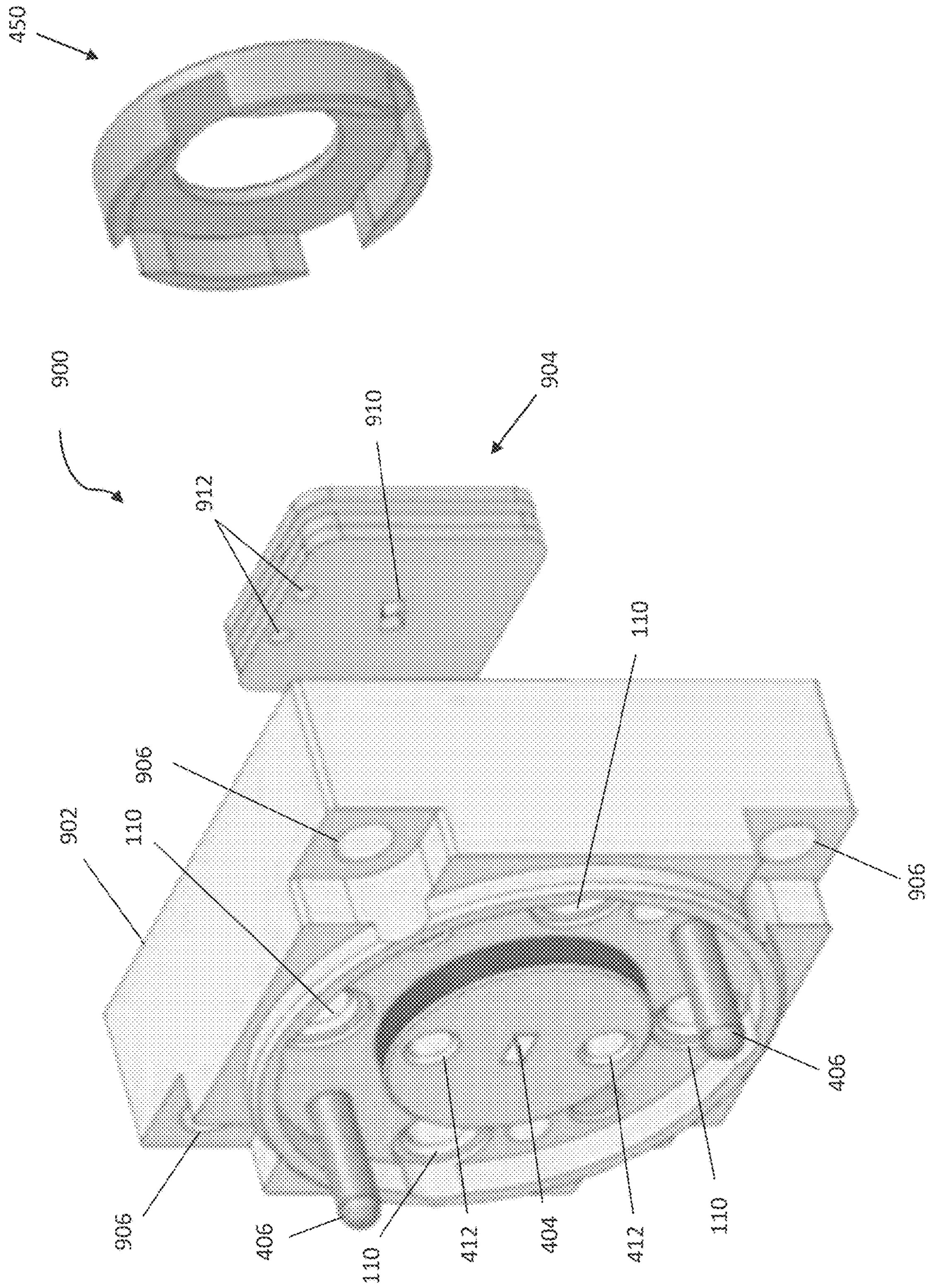
FIG. 9A is a front view of an integrated waveguide twist assembly with square shims.
Figure 9B:
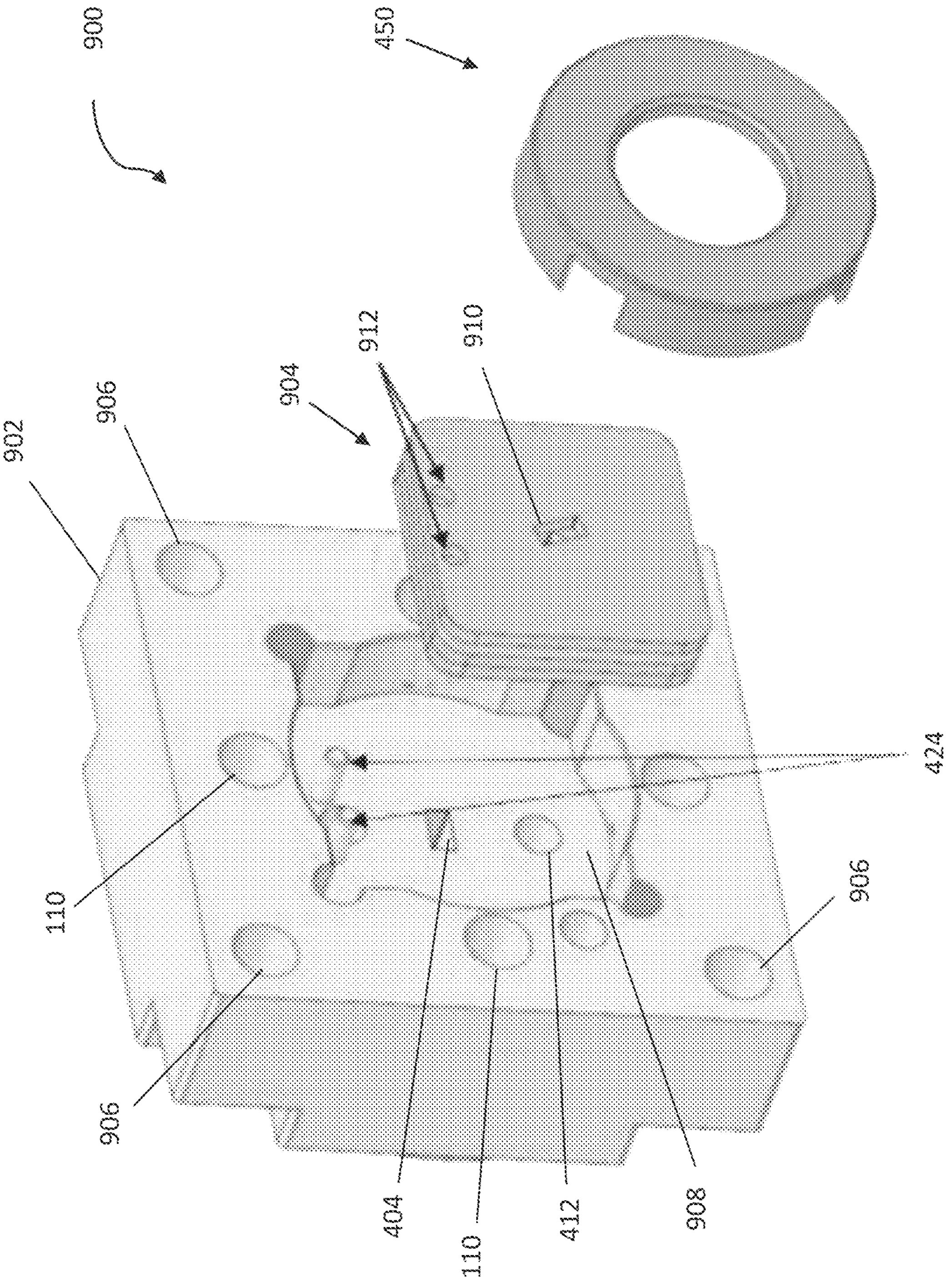
FIG. 9B is a rear view of an integrated waveguide twist assembly with square shims.

FIGS. 8A-8D are a rear view, side view, front view, and peripheral front view of backing plate 450, respectively. Backing plate 450 includes an opening 802 through which RF waves can travel unimpeded from a waveguide or waveguide module to shims 430 (shown in FIGS. 7A and 7B). Blacking plate 450 has a side wall along the periphery to fit over shims 430 and secure them to flange 304, as shown in FIG. 5B. Backing plate 450 can further include indents 804 in the side wall to receive corners of square-shaped shims, as shown in FIGS. 9A and 9B. In other aspects of the described subject matter, backing plate 450 does not have indents 804.

FIGS. 9A and 9B are a front view and rear view, respectively, of an integrated waveguide twist assembly 900 with a flange 902 configured for square shims 904. Similar to flange 304, flange 902 can be configured for integration in an IEEE 1785.2 standard waveguide interface and have screw holes 110, holes 412 to receive precision dowels, fixed alignment pins 406 extending from second side 303, and alignment holes 408. Flange 902 can have a square footprint with holes 906 at each corner to couple with a waveguide or waveguide module. Flange 902 also has rectangular cavity 404 and pins 424. Unlike flange 304, flange 902 can include a recess 908 shaped to receive square shims 904. As shown in FIG. 9B, recess 908 can be shaped to receive either disk-shape shims, such as shims 430, or square shims 904. Square shims 904 include a square profile and include a rectangular cavity 910 sized equal to or slightly larger than waveguide cavity 204 in waveguide module 200 (or a waveguide), as shown in FIG. 3, and holes 912. As square shims 904 are not disk-shaped, holes are for positioning the square shims 904 into flange 902 and not for indexing. Thus, square shims 904 are not identical to each other, but rather rectangular cavity 910 in each square shim 904 has a different angular orientation based on the desired incremental rotation of the RF waves between shims 904.

Figure 10:
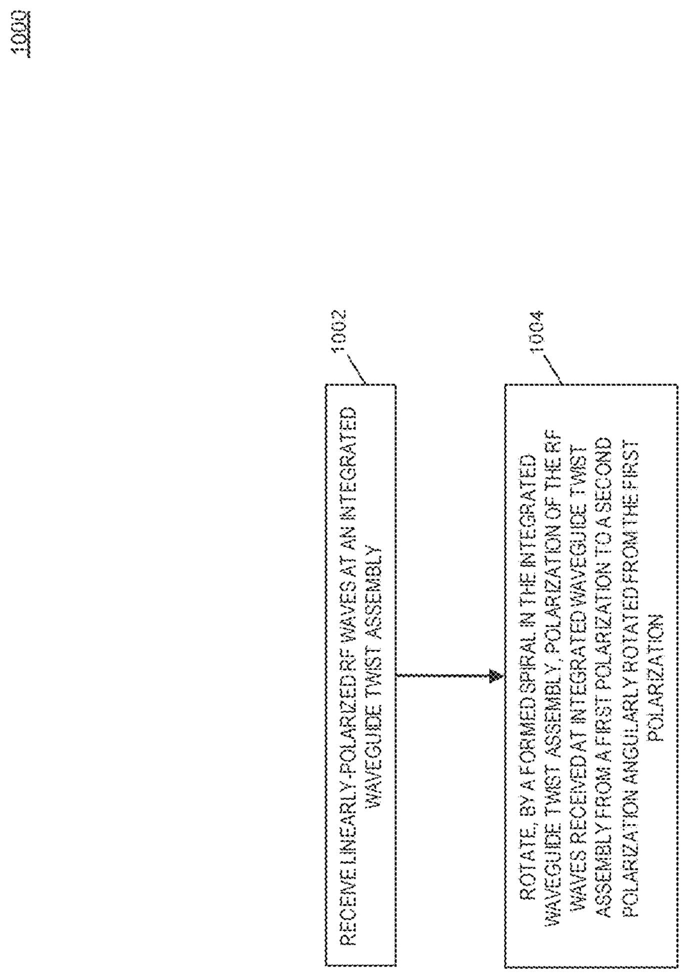
FIG. 10 is a flow diagram illustrating an example method for rotating polarization of RF waves emitted from a waveguide.

FIG. 10 is a flow diagram illustrating an example method 1000 for rotating polarization of RF waves emitted from a waveguide. At step 1002, linearly-polarized RF waves are received at an integrated waveguide twist assembly. The integrated waveguide twist assembly includes a flange coupled to a waveguide interface at a first side of the flange. The system can be configured for integration into an Institute of Electrical and Electronics Engineers (IEEE) 1785 and/or a UG-387 standard waveguide flange interface standard waveguide flange interface and, thus, integrate directly with the waveguide flange rather than an antenna or another intervening component. The flange includes a recess at the first side of the flange, a rectangular cavity through the flange and located in the recess, and pins extending from the recess. The integrated waveguide twist assembly further includes a plurality of shims configured for stacking in the recess. The shims each include a rectangular cavity and holes configured to receive the pins and position the plurality of shims in the recess such that the rectangular cavities form a spiral. The integrated waveguide twist assembly can include a backing plate configured to secure the plurality of shims in the recess. The shims each can include a disc and the holes can be formed along a circumference of the disc. The holes can include indexing holes to fix the rectangular cavity of each of the shims at a predetermined angular orientation for incrementally changing the polarization of an RF wave output from the waveguide or a previous one of the shims. The shims can be identical to each other and each shim can include more holes than the flange comprises pins. The shims can be reversible to rotate the polarization of RF waves±an angle from the first polarization. For example, rather than orienting the shims to rotate the RF waves clockwise, the shims can be reversed and stacked to the rotate the RF waves counterclockwise. The shims can include four shims and each shim can include six holes. The shims each can include a square profile. The integrated waveguide twist assembly can further include a backing plate configured to secure the plurality of shims in the recess, wherein a wall of the backing plate comprises indents to receive corners of the shims. Removing at least one shim of the plurality of shims can reduce the degree of angular rotation from the first polarization to the second polarization.

At step 1004, the formed spiral rotates polarization of the RF waves received at the integrated waveguide twist assembly from a first polarization to a second polarization angularly rotated from the first polarization. The second polarization can be rotated by an angle of 90° from the first polarization.

It will be appreciated that method 1000 is for illustrative purposes and that different and/or additional actions may be used. It will also be appreciated that various actions described herein may occur in a different order or sequence. It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

The following material is incorporated by reference in its entirety:

IEEE Std. 1785.2; Standard for Rectangular Metallic Waveguides and Their Interfaces for Frequencies of 110 GHz and Above. IEEE Microwave Theory and Techniques Society, 2016.

What is claimed is:

1. A system for rotating polarization of radio frequency (RF) waves, the system comprising:

a flange configured to couple to a waveguide interface at a first side of the flange, the flange comprising:
- a recess at the first side of the flange;
- a rectangular cavity through the flange and located in the recess; and
- pins extending from the recess;

a plurality of shims configured for stacking in the recess, wherein the shims each comprise:

a rectangular cavity; and holes configured to receive the pins and position the plurality of shims in the recess such that the rectangular cavities form a spiral configured to rotate polarization of linearly-polarized RF waves received at the flange from a first polarization to a second polarization angularly rotated from the first polarization.

2. The system of claim 1 wherein the second polarization is rotated by an angle of 90° from the first polarization.

3. The system of claim 1 wherein removing at least one shim of the plurality of shims reduces the degree of angular rotation from the first polarization to the second polarization.

4. The system of claim 1 wherein the shims each comprise a disc and the holes are formed along a circumference of the disc.

5. The system of claim 4 wherein the holes comprise indexing holes to fix the rectangular cavity of each of the shims at a predetermined angular orientation for incrementally changing the polarization of an RF wave traveling through the flange.

6. The system of claim 4 wherein the shims are identical to each other and each shim comprises more holes than the flange comprises pins.

7. The system of claim 1 wherein the shims each comprise a square profile.

8. The system of claim 7 comprising a backing plate configured to secure the plurality of shims in the recess, wherein a wall of the backing plate comprises indents to receive corners of the shims.

9. The system of claim 1 wherein the shims are reversible to rotate the polarization of RF waves±an angle from the first polarization.

10. The system of claim 9 wherein the system is configured for integration into an Institute of Electrical and Electronics Engineers (IEEE) 1785.2 and/or a UG-387 standard waveguide flange interface.

11. A method for rotating polarization of radio frequency (RF) waves, the method comprising:

receiving, at an integrated waveguide twist assembly, linearly-polarized RF waves, the integrated waveguide twist assembly comprising:

a flange coupled to a waveguide interface at a first side of the flange, the flange comprising:

a recess at the first side of the flange;

a rectangular cavity through the flange and located in the recess; and pins extending from the recess;

a plurality of shims configured for stacking in the recess, wherein the shims each comprise:

a rectangular cavity; and holes configured to receive the pins and position the plurality of shims in the recess such that the rectangular cavities form a spiral; and rotating, by the formed spiral, polarization of the RF waves received at the integrated waveguide twist assembly from a first polarization to a second polarization angularly rotated from the first polarization.

12. The method of claim 11 wherein the second polarization is rotated by an angle of 90° from the first polarization.

13. The method of claim 11 wherein removing at least one shim of the plurality of shims reduces the degree of angular rotation from the first polarization to the second polarization.

14. The method of claim 11 wherein the shims each comprise a disc and the holes are formed along a circumference of the disc.

15. The method of claim 14 wherein the holes comprise indexing holes to fix the rectangular cavity of each of the shims at a predetermined angular orientation for incrementally changing the polarization of an RF wave output from the waveguide or a previous one of the shims.

16. The method of claim 14 wherein the shims are identical to each other and each shim comprises more holes than the flange comprises pins.

17. The method of claim 11 wherein the shims each comprise a square profile.

18. The method of claim 17 wherein the integrated waveguide twist assembly comprises a backing plate configured to secure the plurality of shims in the recess, wherein a wall of the backing plate comprises indents to receive corners of the shims.

19. The method of claim 11 wherein the shims are reversible to rotate the polarization of RF waves±an angle from the first polarization.

20. The method of claim 19 wherein the system is configured for integration into an Institute of Electrical and Electronics Engineers (IEEE) 1785.2 and/or a UG-387 standard waveguide flange interface.

* * * * *